(12) United States Patent
Arai et al.

(10) Patent No.: US 7,138,645 B2
(45) Date of Patent: Nov. 21, 2006

(54) CALIBRATION PATTERN UNIT PHOTOGRAPHED BY AN IMAGING SYSTEM TO ACQUIRE AN IMAGE FOR OBTAINING CORRECTION INFORMATION

(75) Inventors: Kazuhiko Arai, Hachioji (JP); Akio Kosaka, Hachioji (JP); Takashi Miyoshi, Atsugi (JP); Kazuhiko Takahashi, Hachioji (JP); Hidekazu Iwaki, Hachioji (JP)

(73) Assignee: Olympus Corporation, Tokyo (JP)

( * ) Notice: Subject to any disclaimer, the term of this patent is extended or adjusted under 35 U.S.C. 154(b) by 157 days.

(21) Appl. No.: 10/650,619

(22) Filed: Aug. 28, 2003

(65) Prior Publication Data

US 2004/0044496 A1   Mar. 4, 2004

(30) Foreign Application Priority Data

Aug. 29, 2002   (JP) .............................. 2002-251635

(51) Int. Cl.
G01C 11/22 (2006.01)
G06K 9/00 (2006.01)
G01B 7/00 (2006.01)
F16M 11/00 (2006.01)

(52) U.S. Cl. ................ 250/559.1; 702/155; 248/163.1; 382/154

(58) Field of Classification Search ................ 382/294, 382/151, 288, 154; 250/559.1, 559.08; 396/95; 702/155; 248/163.1
See application file for complete search history.

(56) References Cited

U.S. PATENT DOCUMENTS

| 4,689,523 | A | * | 8/1987 | Fowler | 315/76 |
| 4,923,155 | A | * | 5/1990 | Dainis et al. | 248/163.1 |
| 5,214,872 | A | * | 6/1993 | Buyalos, Jr. | 43/1 |
| 5,768,443 | A | * | 6/1998 | Michael et al. | 382/294 |
| 5,923,727 | A | * | 7/1999 | Navab | 378/207 |

FOREIGN PATENT DOCUMENTS

| JP | 11-166818 | | 6/1999 |
| JP | 2001-82941 | | 3/2001 |
| JP | 2001082941 A | * | 3/2001 |

* cited by examiner

*Primary Examiner*—Georgia Epps
*Assistant Examiner*—Brian Livedalen
(74) *Attorney, Agent, or Firm*—Scully, Scott, Murphy & Presser, PC

(57) ABSTRACT

A calibration pattern unit which obtains correction information of an imaging system by imaging at the imaging system is formed by combining a plurality of three-dimensionally arranged planes. The calibration pattern unit comprises supporting members each of which has a predetermined surface corresponding to one of the planes, and a calibration pattern in which a predetermined pattern is formed on the predetermined surface of the supporting member. The supporting member can selectively set the calibration pattern unit to a first form for photographing when the correction information is obtained, and a second form for other purposes.

22 Claims, 5 Drawing Sheets

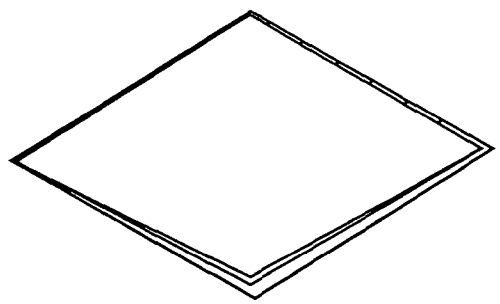
F I G. 3A
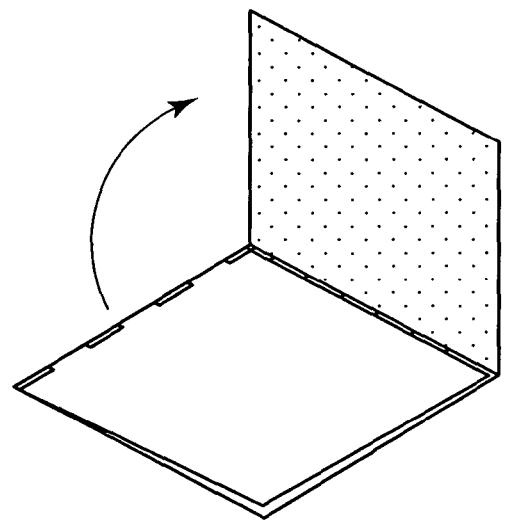
F I G. 3B
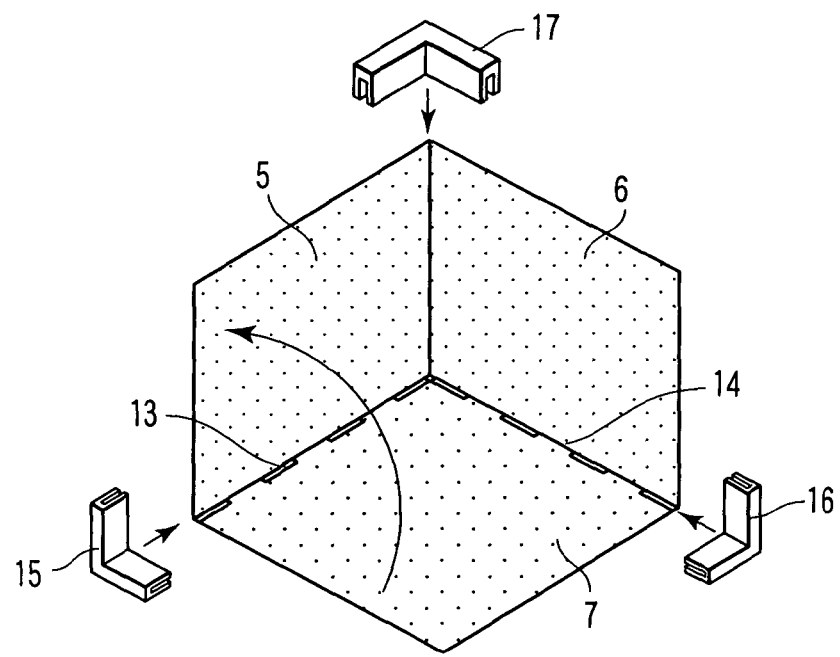
F I G. 3C

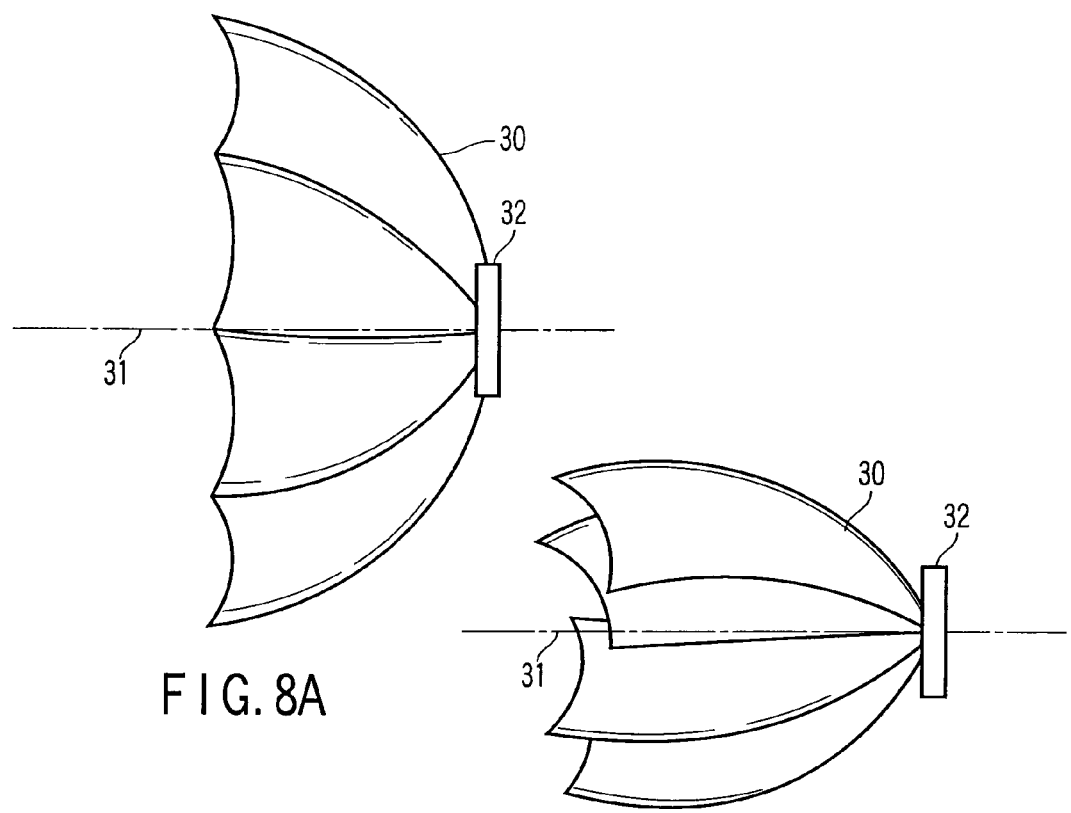
FIG. 8A
FIG. 8B
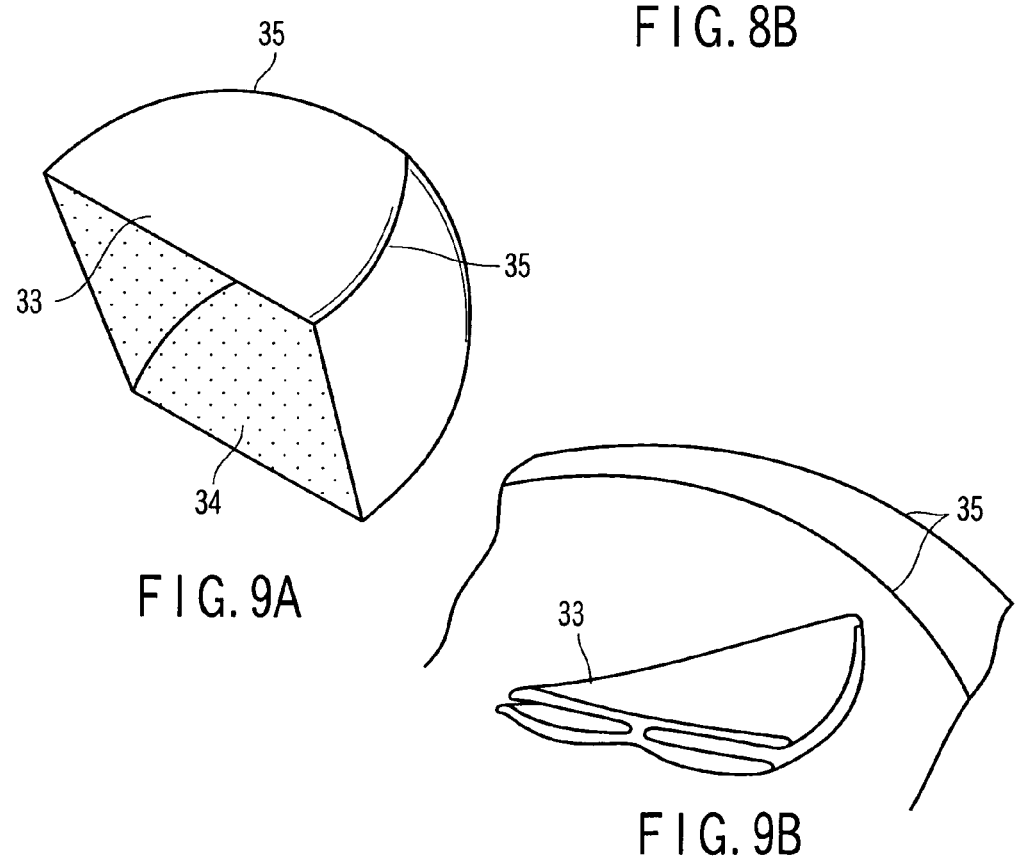
FIG. 9A
FIG. 9B

CALIBRATION PATTERN UNIT PHOTOGRAPHED BY AN IMAGING SYSTEM TO ACQUIRE AN IMAGE FOR OBTAINING CORRECTION INFORMATION

CROSS-REFERENCE TO RELATED APPLICATIONS

This application is based upon and claims the benefit of priority from the prior Japanese Patent Application No. 2002-251635, filed Aug. 29, 2002, the entire contents of which are incorporated herein by reference.

BACKGROUND OF THE INVENTION

1. Field of the Invention

The present invention relates to a calibration pattern unit used to obtain correction information of an imaging system.

2. Description of the Related Art

Various calibration patterns used to obtain correction information of the imaging system have conventionally been presented. For example, Jpn. Pat. Appln. KOKAI Publication No. 11-166818 discloses a calibration method and a calibration device of a three-dimensional shape measuring device for using a calibration pattern in which a known geometric pattern is drawn on a flat plate, and obtaining correction information of an imaging system by changing a relative distance between the pattern and the imaging system. Jpn. Pat. Appln. KOKAI Publication No. 2001-82941 discloses a technology for configuring a three-dimensional calibration pattern unit by drawing similar known geometric patterns on surfaces of a corner cube structure, and obtaining correction information of an imaging system.

BRIEF SUMMARY OF THE INVENTION

According to a first aspect of the present invention, there is provided a calibration pattern unit which obtains correction information of an imaging system by imaging at the imaging system and is formed by combining a plurality of three-dimensionally arranged planes, the unit comprising:

supporting members each of which has a predetermined surface corresponding to one of the planes; and a calibration pattern in which a predetermined pattern is formed on the predetermined surface of the supporting member, wherein the supporting member can selectively set the calibration pattern unit to a first form for photographing when the correction information is obtained, and a second form for other purposes.

According to a second aspect of the present invention, there is provided a calibration pattern unit which obtains correction information of an imaging system by imaging at the imaging system, comprising:

supporting members each of which has a predetermined surface corresponding to one of one plane of three-dimensionally arranged planes and one curved surface of three-dimensionally arranged curved surfaces; and a calibration pattern in which the predetermined pattern is formed on a predetermined surface of the supporting member, wherein the supporting member has first use for photographing when the correction information is obtained, and second use for other purposes.

According to a third aspect of the present invention, there is provided a calibration pattern unit which obtains correction information of an imaging system by imaging at the imaging system, comprising:

supporting members each of which has a predetermined surface corresponding to one of one curved surface of three-dimensionally arranged curved surfaces and one plane of three-dimensionally arranged planes; and a calibration pattern in which a predetermined pattern is formed on the predetermined surface of the supporting member, wherein the supporting member can selectively set the calibration pattern unit to a first form for photographing when the correction information is obtained, and a second form for other purposes.

According to a fourth aspect of the present invention, there is provided a calibration pattern unit which obtains correction information of an imaging system by imaging at the imaging system, comprising:

a framework member with a flexibility;

a supporting member, made of a flexible material, and configured to use a tensile force generated by fixing the framework member in a predetermined position to be formed in a shape combining one of three-dimensionally arranged curved surfaces and three-dimensionally arranged planes; and a calibration pattern in which a predetermined pattern is formed on a predetermined surface of the supporting member.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 3A is a view showing a second form of a calibration pattern unit according to a second embodiment of the present invention;

FIG. 3B is a view showing a spread state of the calibration pattern unit of the second embodiment;

FIG. 3C is a view showing a state immediately before a first form of the calibration pattern unit of the second embodiment is set;

FIG. 8A is a view showing a second form of a calibration pattern unit according to a sixth embodiment of the present invention;

FIG. 8B is a view showing a first form of the calibration pattern unit of the sixth embodiment;

FIG. 9A is a view showing a second form of a calibration pattern unit according to a seventh embodiment of the present invention; and FIG. 9B is a view showing a first form of the calibration pattern unit of the seventh embodiment.

DETAILED DESCRIPTION OF THE INVENTION

Before each embodiment of a calibration pattern unit of the present invention is described in detail, explanation will be made of an example of a known geometric pattern which is a predetermined pattern drawn on the calibration pattern unit. The example of the known geometric pattern is common to all the embodiments.

Figure 1:
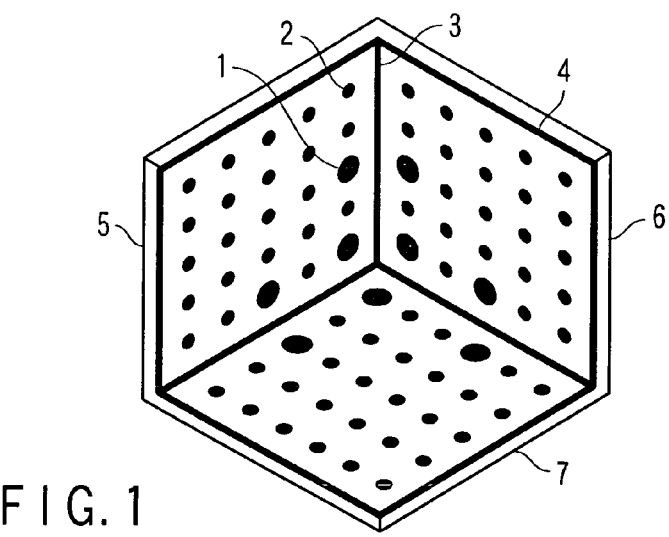
FIG. 1 is a view illustrating a calibration pattern.

That is, as shown in FIG. 1, a known geometric pattern is constituted of pluralities of large and small black circles 1 and 2, a surface crossline 3 and an outer boundary line 4. Such a known geometric pattern is drawn on three flat plate supporting members 5, 6, 7, and the three flat plate supporting members are combined to configure a calibration pattern unit. The large and small black circles 1, 2, the surface crossline 3 and the outer boundary line 4 constituting the known geometric pattern, i.e., pattern components, are drawn at constant intervals by a certain rule. The intervals and the rule can be optionally selected depending on necessary imaging system correction information or the like, and the invention imposes no restrictions. For example, the black circle may be a cross mark or a black and white double circle. The black circles may be differentiated from each other by color information in place of size. The surface crossline 3 and the outer boundary line 4 may be broken lines. Additionally, there are no specific restrictions on areas.

The correction information indicates an image magnification, an optical axis center, distortion or a coordinate transformation matrix between coordinate systems disposed on a plurality of imaging systems. There are no restrictions on accuracy of obtained information, combination or addition of new information values in accordance with a purpose.

In the drawings referred to in the following description of each embodiment, a known geometric pattern similar to the above is actually drawn on the supporting member. However, to simplify the drawings, only a place of a surface on which the known geometric pattern is drawn is shown by hatching when necessary. This portion is referred to as a pattern drawn surface.

As the imaging system of the present invention to carry out calibration, various imaging systems such as a film camera, a digital camera, a video camera, a microscopic endoscope, a multiple-lens stereo camera, a pattern projection camera and a slit scan camera are available, and there are no restrictions on types.

Next, the preferred embodiments of the present invention will be described with reference to the accompanying drawings.

[First Embodiment]

First, description will be made of a first embodiment of the present invention by referring to FIGS. 2A to 2C.

Figure 2A:
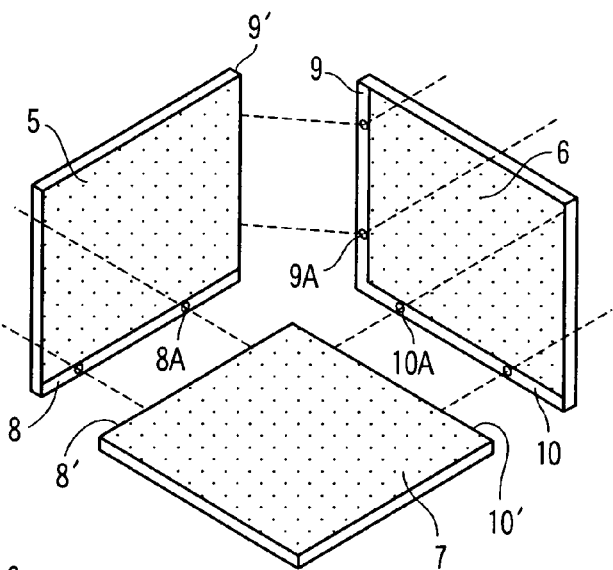
FIG. 2A is an assembled view of a calibration pattern unit according to a first embodiment of the present invention.

As shown in FIG. 2A, in a calibration pattern unit of the first embodiment of the present invention, in a supporting member 5, a supporting member connection section 8 having a screw hole 8A and a supporting member connection section 9' having a not-shown screw hole are formed on two adjacent sides. In a supporting member 6, a supporting member connection section 9 having a screw hole 9A and a supporting member connection section 10 having a not-shown screw hole are formed on two adjacent sides. In a supporting member 7, a supporting member connection section 8' having a not-shown screw hole and a supporting member connection section 10' having a not-shown screw hole are formed on two adjacent sides. The supporting member connection sections are combined to be joined together, i.e., 8 to 8', 9 to 9', and 10 to 10', along connection lines indicated by broken lines in the drawing, and fastened by not-shown screws. Reference surfaces are formed on the joined surfaces by stepping and bumping. Thus, the supporting members 5, 6, 7 can be mounted to one another so that the surfaces can be set accurately orthogonal, i.e., normals of the surfaces thereof can be orthogonal to one another. In the specification, the surface of the supporting member means a surface constituting each pattern drawn section when the supporting member comprises a plurality of pattern drawn sections, or a surface divided at a polygonal line by folding of the pattern drawn section when the supporting member comprises a single pattern drawn section as in the case of the other later-described embodiment.

Figure 2B:
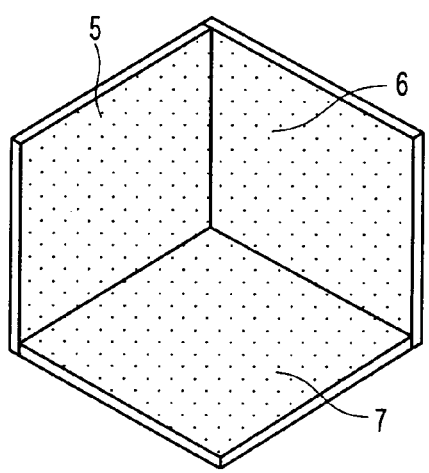
FIG. 2B is a view showing a first form of the calibration pattern unit of the first embodiment.

FIG. 2B shows a first form which is an assembled state. In the embodiment, the screws are used for connection. Needless to say, however, stepped pins may be used in place of screws, the supporting members may be jointed together by magnets without using screw holes, and thus there are no restrictions on joining means.

According to the calibration pattern unit of the foregoing configuration, since the pattern drawn surfaces of the supporting members 5, 6, 7 are formed by surface accuracy as high as possible, in combination with assembling accuracy provided by the supporting member connection sections 8, 8', 9, 9', 10, 10', the known calibration pattern can be three-dimensionally arranged by high positional accuracy as a result.

A method for drawing patterns on the supporting members 5, 6, 7 can be implemented by, for example, sticking paper or a resin sheet on which a highly accurately prepared pattern is printed separately by a printer to the accurately formed pattern drawn surface by an adhesive or the like without any positional shifting. In manufacturing, direct machine work may be carried out to supply paint into holes bored in the supporting members 5, 6, 7. Further, another member of a different color may be buried in the hole section. In such cases, the supplied paint surface and the member of the different color are located deeper than other portions to function as pattern protection sections. Thus, deterioration of the pattern section can be prevented. Patterns may be directly printed on the supporting members 5, 6, 7. In this case, a pattern protection section can be constituted of a laminate cover or the like. Thus, the present invention imposes no restrictions on the method for drawing patterns on the supporting members 5, 6, 7.

There are no particular restrictions on materials of the supporting members 5, 6, 7. Metal plates, resin plates, cardboards, woods etc., can be used as long as a flat plate state can be maintained. In the embodiment, the pattern drawn surface is present on an inner wall surface of a corner cube constituted of the supporting members 5, 6, 7. However, a pattern may be drawn on an outer wall surface. In this case, an installation posture of the calibration pattern unit is changed to enable observation of the entire pattern drawn surface and, by imaging at the imaging system, similar imaging system correction information can be obtained. Needless to say, the free drawn of the pattern drawn surface on the inner wall surface, the outer wall surface of the calibration pattern structure is common to all the embodiments though this point is not mentioned in each of the following embodiments.

Figure 2C:
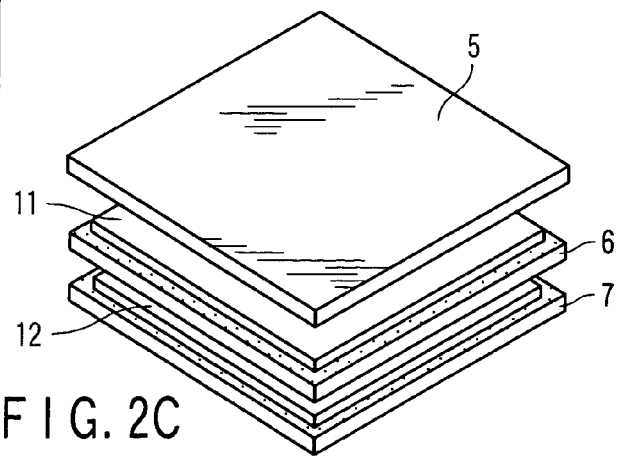
FIG. 2C is a view showing a second form of the calibration pattern unit of the first embodiment.

FIG. 2C shows a second form which is a disassembled state of the calibration pattern unit. That is, in the second form, the pattern drawn surfaces are aligned inward so as not to be exposed to the outside, i.e., so that surfaces on which no patterns are drawn can be exposed to the outside, and the surfaces of the supporting members 5, 6, 7 are arranged roughly in parallel with one another. Here, the outside means a surface, i.e., the outer wall surface, from which the calibration pattern can be observed in its folded state. In the first form, it in no way defines the inner wall surface or the outer wall surface of the calibration pattern unit.

Accordingly, a volume occupied by the first form is larger than that occupied by the second form. Conversely, the volume occupied by the second form is smaller than that occupied by the first form.

In the second form, regarding a surface in which the supporting members are brought into contact with each other, spacer members 11, 12 are pinched in as protection sections to prevent direct contact of at least the pattern drawn surface with the other member, e.g., the supporting member, and all the members are bound by a not-shown packing band or the like. There are no restrictions on materials of the space members 11, 12. A packing material air cap, a sponge, thick cloth, a resin buffer material sheet, a rubber foot disposed at the corner, a laminate material on which a pattern itself is coated, etc., can be used.

In the embodiment, the spacer members 11, 12 are pinched in as separate members. However, rubber feet etc., of colors and sizes which do not interfere with calibration photographing may be arranged beforehand in desired positions of the supporting members 5, 6, 7.

Thus, the presence of the supporting member connection section by screws facilitates assembling/disassembling of the supporting members when necessary. Therefore, carrying to the imaging site and storing during nonuse are facilitated, and a calibration image can be easily photographed when calibration is necessary.

[Second Embodiment]

Next, a second embodiment of the present invention will be described by referring to FIGS. 3A to 3C. In the drawings, portions denoted by reference numerals similar to those of the first embodiment have similar functions.

That is, according to the second embodiment, supporting members 5 and 6 are rotatably connected to each other by a supporting member connection section 13 of a hinge structure. Similarly, supporting members 6 and 7 are rotatably connected to each other by a similar supporting member connection section of a hinge structure. By these supporting member connection sections 13, 14, a calibration pattern unit is assembled from a folded state of FIG. 3A which is a second form in order of FIG. 3B and FIG. 3C. In order to stably hold an assembled shape, fixing tools 15, 16, 17 are inserted as fixing means into corners to constitute the first form which is an assembled state. Conversely, needless to say, in order of FIG. 3C, FIG. 3B and FIG. 3A, a folded state which is a second form can be easily obtained.

Thus, the presence of the supporting member connection section similar to the hinge prevents separation of the supporting members 5, 6, 7 from one another as a whole, and enables configuration of the calibration pattern unit to be easily assembled/disassembled.

Though simply represented in the drawings, if the supporting member connection sections 13, 14 of the hinge structures are present on the same plane with respect to the supporting member 7, smooth folding similar to that shown in FIG. 3A is actually difficult. Thus, contrivance is necessary. For example, the supporting member connection section 14 is formed by disposing an offset of a fixed amount in a direction vertical to the surface of the supporting member 7 in the drawing. Explanation of contrivance of such compact folding is omitted.

[Third Embodiment]

Next, a third embodiment of the present invention will be described by referring to FIGS. 4A to 4C. According to the third embodiment, especially supporting members 5, 6, 7 have structures as surfaces of paper, resin thin plates or the like, and simultaneously made of partially flexible materials. A part of the supporting member 5, and boundaries of the supporting members 5, 6, 7 are folding sections 18, 19, 20, 21 to be folded. That is, the folding section in the specification means a reference line set on an elastic body or paper, and a plurality of portions of the elastic body or the paper can be repeatedly rotated relatively around the reference line.

Figure 4A:
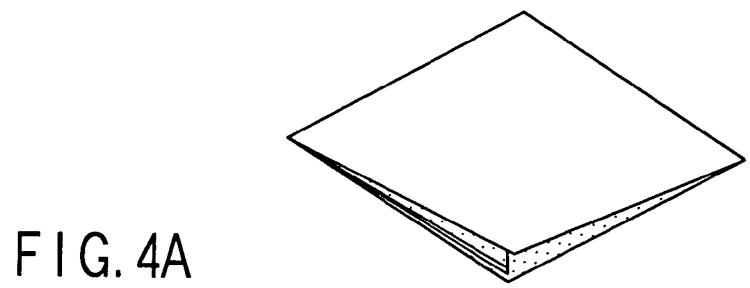
FIG. 4A is a view showing a second form of a calibration pattern unit according to a third embodiment of the present invention.
Figure 4B:
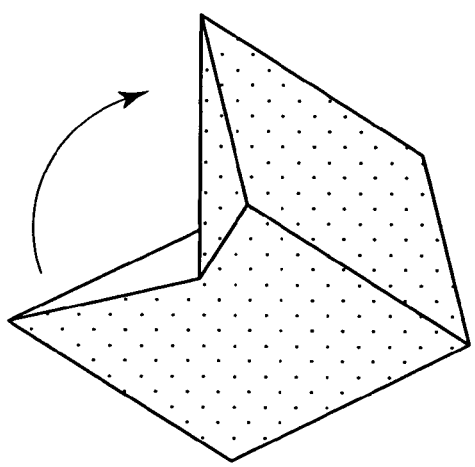
FIG. 4B is a view showing a spread state of the calibration pattern unit of the third embodiment.
Figure 4C:
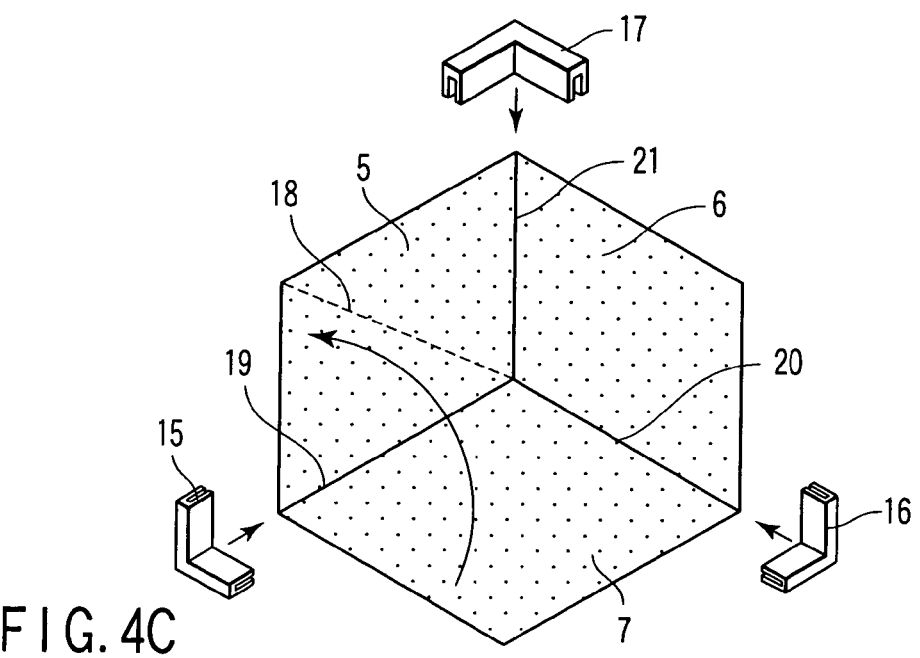
FIG. 4C is a view showing a state immediately before a first form of the calibration pattern unit of the third embodiment is set.

Thus, a calibration pattern unit of the third embodiment of the foregoing configuration is assembled from a folded state of FIG. 4A which is a second form in order of FIG. 4B and FIG. 4C. As in the case of the second embodiment, in order to stably hold the assembled shape, fixing tools 15, 16, 17 are inserted into corners to constitute a first form which is an assembled state.

In the third embodiment, an example in which there are four folding sections is shown. However, the number of folding sections may be increased to realize more compact folding. A calibration pattern unit may be configured to enable folding in a more complex form represented by a so-called "pop-out book". In the case of manufacturing from one piece of planar paper or a resin as in the case of the embodiment, it is necessary to partially apply an adhesive from a spread drawing, which is not shown.

The calibration pattern unit which has such a folding section can be manufactured light by an inexpensive material such as paper, and work such as supplying and distribution when a product which needs calibration can be facilitated.

Figure 5:
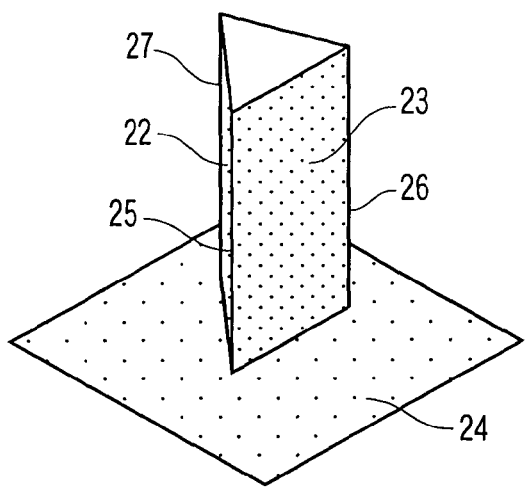
FIG. 5 is a view showing a modification example of the calibration pattern unit of the third embodiment.

FIG. 5 is a view showing a modification example of the third embodiment of the present invention. That is, this calibration pattern unit comprises supporting members 22, 23, 24, and folding sections 25, 26, 27. The supporting members 22, 23 are folded at the folding sections 25, 26, 27 to constitute a triangle pole, and installed in predetermined positions on the separate planar supporting member 24.

Thus, it is possible to configure a more compact calibration pattern unit excellent in carrying.

[Fourth Embodiment]

Figure 6:
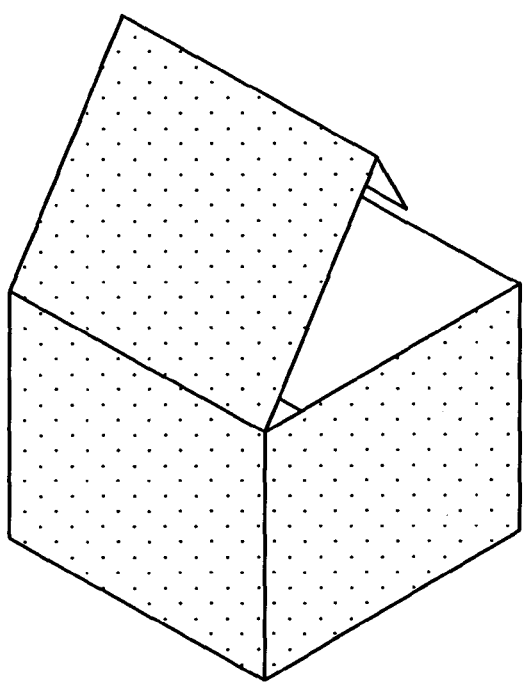
FIG. 6 is a view showing a calibration pattern unit according to a fourth embodiment of the present invention.

Next, a fourth embodiment of the present invention will be described by referring to FIG. 6. According to the fourth embodiment, a supporting member is disposed in a box for packing a product which needs calibration, or an inner box which is based on the premise that a makeup box cover is attached to the outside. An example of drawing a pattern drawn surface on an outer wall surface of the box is shown. Needless to say, however, it may be drawn on an inner wall surface.

Such a configuration enables combined use of the packing box which is first use, and the calibration pattern unit which is second use, and thus costs can be reduced. The outside makeup cover severs also as a pattern protection section.

[Fifth Embodiment]

Figure 7:
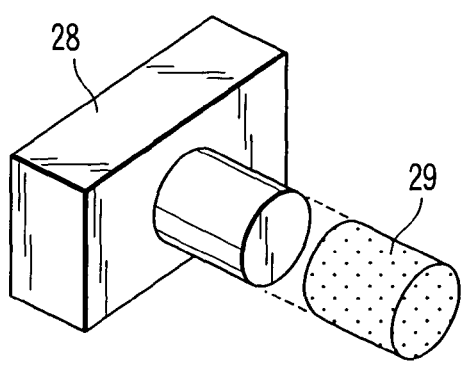
FIG. 7 is a view showing a calibration pattern unit according to a fifth embodiment of the present invention.

Next, a fifth embodiment of the present invention will be described by referring to FIG. 7. That is, according to the fifth embodiment, a cylindrical cover 29 of a lens section of a camera main body 28 constitutes a calibration pattern unit.

Thus, the cover of the camera main body itself carried with a camera which is generally an imaging system for calibration, or a strobe cover may function as a calibration unit which is second use.

[Sixth Embodiment]

Next, a sixth embodiment of the present invention will be described by referring to FIGS. 8A and 8B. That is, according to the sixth embodiment, as shown in FIG. 8A, a plurality of supporting members 30 are made of flat plates which have petaline curved surfaces, and radially arranged around a center axis 31 through. a rotation mechanism (not shown in detail) 32. A known geometric pattern is drawn on an inner wall surface of the supporting member 30, and this portion is a pattern drawn surface.

The calibration pattern unit of such a configuration is folded in the direction of the center axis 31 so that even the rigid supporting member 30 can be housed as shown in FIG. 8B, and first and second forms can be selectively set.

Furthermore, a guide pin and a cam groove (which are neither shown) are disposed in each supporting member 30, and rotational sliding around the center axis 31 and folding in the direction of the center axis 31 are carried out. Accordingly, the plurality of supporting members 30 can be folded in conjunction. Thus, a first form in which the bowl-shaped calibration unit is spread and a second form in which it is housed can be realized.

[Seventh Embodiment]

Next, a seventh embodiment of the present invention will be described by referring to FIGS. 9A and 9B. That is, a calibration pattern unit of the seventh embodiment comprises a supporting member 33, a calibration pattern 34, a flexible framework member 35, and a framework insertion member (not shown). The supporting member 33 is made of a flexible sheet material. As a material, a fiber-reinforced resin sheet or tent cloth reduced in elongation by a tensile force, sail cloth, nylon (trademark) or the like is used. The supporting member 33 is subjected to draping and sewing to become a shape similar to that shown in FIG. 9A. As in the case of the first embodiment, a calibration pattern 34 is drawn on the supporting member 33. In the supporting member 33, a framework insertion member constituted of a loop-shaped guide (not shown), a ring (not shown) or the like is arranged continuously or discretely at a portion which is a top side. A framework member 35 has a rod shape made of an elastic material to generate a tensile force in a spread direction of the supporting member 33.

As shown in FIG. 9A, the supporting member 33 can maintain a first form in which the spread is performed so that a surface formed from a combination of three-dimensionally arranged planes or curved surfaces may be provided by inserting the framework member 35 through the framework insertion member. If the framework member 35 and the supporting member 33 are separated from each other as shown in FIG. 9B, the supporting member 33 is folded. Thus, a compact second form suited to housing and transportation can be provided.

The seventh embodiment shows an example of removing the framework member 35. However, the framework may have a spread mechanism as in the case of an umbrella or a one-touch spread tent, and the supporting member 33 may be spread and housed. In this way, it is possible to configure a calibration pattern unit which has similar effects.

As special effects of the seventh embodiment, an easy reduction in weight by use of the sheetlike supporting member, and a relatively light configuration even if a large calibration pattern unit is manufactured can be cited.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A calibration pattern unit photographed by an imaging system to acquire an image for obtaining correction information of the imaging system, the unit comprising:
    a calibration pattern comprising a predetermined pattern for obtaining correction information of the imaging system; and
    supporting members having a surface formed by at least one of a three-dimensionally arranged plane and curved surface, a predetermined one of the surfaces of the supporting members including the calibration pattern formed thereon, and the supporting members being configured to selectively set the calibration pattern unit in a first form for photographing when the correction information is obtained, and in a second form for other purposes.

2. The unit according to claim 1, wherein a volume occupied by the first form is larger than that occupied by the second form.

3. The unit according to claim 2, wherein in the first form, normals of the predetermined surfaces constituting the supporting members are arranged orthogonally to one another.

4. The unit according to claim 1, wherein in the second form, the predetermined surfaces constituting the supporting members are arranged roughly in parallel with one another.

5. The unit according to claim 1, wherein in the second form, a surface of the supporting member in which the calibration pattern is not formed is exposed to the outside.

6. The unit according to claim 5, further comprising:
    protection sections configured to prevent direct contact between the supporting member and the calibration pattern and between the calibration patterns themselves in the second form.

7. The unit according to claim 5, further comprising:
    spacer sections configured to prevent contact between the supporting member and the calibration pattern and between the calibration patterns themselves in the second form.

8. The unit according to claim 1, further comprising:
    connection sections which can separate and rejoin the plurality of supporting members from/to one another.

9. The unit according to claim 1, further comprising:
    connection sections configured to change relative positions and postures of the predetermined surfaces of the supporting members while the predetermined surfaces are connected.

10. The unit according to claim 9, further comprising:
fixing tools configured to fix relative positions of the predetermined surfaces of the supporting members.

11. The unit according to claim 1, further comprising:
folding sections configured to change relative positions and postures of the predetermined surfaces of the supporting members without releasing connection between the predetermined surfaces themselves.

12. The unit according to claim 11, further comprising:
fixing tools configured to fix relative positions of the predetermined surfaces of the supporting members.

13. The unit according to claim 1, wherein the second use is for packing the imaging system.

14. The unit according to claim 1, wherein the second use is for protecting the imaging system.

15. The calibration pattern unit according to claim 1, wherein the second form is a form for one of carrying and storing the calibration pattern unit.

16. A calibration pattern unit photographed by an imaging system to acquire an image for obtaining correction information of the imaging system, the unit comprising:
a calibration pattern comprising a predetermined pattern for obtaining correction information of the imaging system; and
supporting members having a surface formed by a three-dimensionally arranged plane and curved surface, a predetermined one of the surfaces of the supporting members including the calibration pattern formed thereon, and the supporting members being configured to selectively set the calibration pattern unit in a first form for photographing when the correction information is obtained, and in a second form for other purposes.

17. The calibration pattern unit according to claim 16, wherein the second form is a form for one of carrying and storing the calibration pattern unit.

18. A calibration pattern unit photographed by an imaging system to acquire an image for obtaining correction information of the imaging system, the unit comprising:
a calibration pattern comprising a predetermined pattern for obtaining correction information of the imaging system;
a framework member with a flexibility; and
a supporting member configured to use a tensile force generated by fixing the framework in a predetermined position so as to form surfaces by at least one of a three-dimensionally arranged plane and curved surface, and a predetermined one of the surfaces of the supporting member including the calibration pattern formed thereon.

19. The unit according to claim 18, wherein the framework member and the supporting member can be separated from each other.

20. A calibration pattern unit photographed by an imaging system to acquire an image for obtaining correction information of the imaging system, the unit comprising:
a calibration pattern comprising a predetermined pattern for obtaining correction information of the imaging system; and
supporting means having a surface formed by at least one of a three-dimensionally arranged plane and curved surface, the surface of the supporting means including the calibration pattern formed thereon, and the supporting means selectively setting the calibration pattern unit in a first form for photographing when the correction information is obtained, and in a second form for other purposes.

21. A calibration pattern unit photographed by an imaging system to acquire an image for obtaining correction information of the imaging system, the unit comprising:
a calibration pattern comprising a predetermined pattern for obtaining correction information of the imaging system; and
supporting means having a surface formed by a three-dimensionally arranged plane and curved surface, the surface of the supporting means including the calibration pattern formed thereon, and the supporting means selectively setting the calibration pattern unit in a first form for photographing when the correction information is obtained, and in a second form for other purposes.

22. A calibration pattern unit photographed by an imaging system to acquire an image for obtaining correction information of the imaging system, the unit comprising:
a calibration pattern comprising a predetermined pattern for obtaining correction information of the imaging system;
a framework member with a flexibility; and
supporting means for using a tensile force generated by fixing the framework in a predetermined position so as to form a surface by at least one of a three-dimensionally arranged plane and curved surface, and the surface of the supporting means including the calibration pattern formed thereon.

* * * * *